United States Patent [19]
Ohgoshi et al.

[11] Patent Number: 5,666,352
[45] Date of Patent: Sep. 9, 1997

[54] CDMA MOBILE COMMUNICATION SYSTEM AND METHOD WITH IMPROVED PHASE CORRECTION FEATURES

[75] Inventors: Yasuo Ohgoshi; Nobukazu Doi, both of Hachioji; Takashi Yano, Tokorozawa, all of Japan

[73] Assignee: Hitachi, Ltd., Tokyo, Japan

[21] Appl. No.: 503,628

[22] Filed: Jul. 18, 1995

[30] Foreign Application Priority Data

Jul. 20, 1994 [JP] Japan .................................... 6-167675

[51] Int. Cl.$^6$ .............................. H04B 7/216; H04J 13/02
[52] U.S. Cl. ............................ 370/206; 370/335; 375/200
[58] Field of Search ...................................... 375/200, 205, 375/206, 208, 209, 210; 455/38.1, 53.1, 54.1; 380/34; 370/203, 204, 206, 208, 328, 329, 335, 342, 441

[56] References Cited

PUBLICATIONS

"A Study on Demodulation Method for CDMA Mobile Phone" by Hideshi Murai, et al., Spring Symposium of 1994 of the Institute of Electronics, Information and Communication Engineers, A-5 Spread Spectrum, A-288, pp. 1-270 1994.

Proceedings of IEEE VTC 1994, vol. 1, 8-10, Jun. 1994, NY, USA pp. 51-55, Doi, et al. "DS/CDMA prototype system transmitting low bit-rate voice and high bit-rate ISDN signals", right col., line 20—p.53, left col., line 21; Figure 3.

Primary Examiner—Alpus H. Hsu
Attorney, Agent, or Firm—Antonelli, Terry, Stout & Kraus, LLP

[57] ABSTRACT

A mobile station of a code division multiple access mobile communication system for transmission by carrying out quadrature multiplexing of a pilot signal and a data signal having I and Q components spread by spectrum from the base station to the mobile station, includes a despreading circuit for generating phase error signals (ΔI, ΔQ) by despreading the quadrature multiplexed reception signals (I', Q') by using despreading codes for pilot symbol, another spreading circuit for generating a data signal group by despreading the reception signals by using spreading codes for data symbol, accumulators for converting the transmission rate of the phase error signals and the data signal group into the symbol rate, an averaging circuit for generating phase correction signals from the phase error signals of the symbol rate, and a phase correction circuit for generating data signals (I, Q) with the phase shifts being removed therefrom, by correcting the data signal group by the phase correction signals.

6 Claims, 6 Drawing Sheets

CDMA MOBILE COMMUNICATION SYSTEM AND METHOD WITH IMPROVED PHASE CORRECTION FEATURES

BACKGROUND OF THE INVENTION

1. Field of the Invention

The present invention relates to a mobile communication system, and more particularly to a mobile station for a CDMA (Code Division Multiple Access) mobile communication system which uses pilot signals inserted in a forward link for data demodulation, and a detection method to be used at the mobile station.

2. Description of the Related Art

A coherent detection method using a PLL (Phase Locked Loop) circuit and a differential detection method are known as conventional detection (demodulation) methods.

With the coherent detection method, shifts of a carrier frequency and phase in a carrier band between transceivers are compensated by a PLL circuit at a receiver side. In a mobile communication system incorporating a coherent detection method, a PLL circuit cannot follow the state (dynamic characteristics) when fading or the like is generated because of a moving mobile station, and there is a problem of a considerably degraded error rate performance.

With the differential detection method on the other hand, data is converted into phase differences of a transmission signal by differential coding, and transmitted from a transmitter. At a receiver, data is demodulated by differential coding without obtaining the absolute phase of data. With this method, although it is not necessary to make the frequency and absolute phase coincide both at the receiver and transmitter, the error rate performance is degraded even at the state (static characteristics) when a mobile station is at a standstill.

As one of the detection methods for ensuring that the error rate performance is not degraded in both the dynamic and static characteristics, a data demodulation method has been proposed which uses pilot signals inserted in a forward link (channel), as described, for example, in "A study on Demodulation Method for CDMA Mobile Phone", by Hideshi MURAI et al., Spring Symposium of 1994 of the Institute of Electronics, Information and Communication Engineers, A-5 Spread Spectrum, A-268, p. 1–270 (1994).

FIG. 2 illustrates the procedure of signal modulation/demodulation at a base station 51 and a mobile station 52 in a conventional CDMA mobile communication system using pilot signals inserted in a forward link.

The base station 51 converts a transmission signal (data signal) to each mobile station 52 into two series of data signals (I, Q) 50 by a serial-parallel converter or coding circuit, and supplies the data signals I and Q to respective multipliers 501A and 501B to spread them by using spreading codes ($PN_{ID}$, $PN_{QD}$) 54 for data symbol.

For example, as the spreading codes, codes of a 128-chip length having a symbol rate 128 times faster than that of the data signals. Each code (bit "1" or "0") of transmission data is converted into a code pattern made of 128 chips and into a phase inverted code pattern.

The data signals I and Q spread by the spreading codes 54 are quadrature-multiplexed at the multipliers 502A and 502B, for example, by QPSK (Quadrature Phase Shift Keying), thereafter added together by an adder 503, and transmitted from an antenna in the form of radio waves in a radio frequency band 55. FIG. 10A shows a relationship between the combinations of the values ("1" and "0") of the signals I and Q and the signal constellation by QPSK.

In order to communicate with a plurality of mobile stations, the base station assigns a spreading code for data symbol specific to each mobile station to form a plurality of signal channels. For example, at a channel X, the data signals I(X) and Q(X) are spread by spreading codes $PN_{ID}$(X) and $PN_{QD}$(X) specific to the channel (X), whereas at a channel Y, the data signals I(Y) and Q(Y) are spread by spreading codes $PN_{ID}$(Y) and $PN_{QD}$(Y) specific to the channel (Y).

In addition to data signals for a plurality of channels, the base station 51 transmits pilot signals which are used as a reference signal at each mobile station 52 for the demodulation of data signals. For the pilot signals, two series of signals I(P) and Q(P) having a fixed bit pattern (continuous pattern of bits "1") are spread by spreading codes $PN_{IP}$ and $PN_{QP}$ specific to each pilot signal channel having a chip pattern different from that of the spreading codes 54 for data symbol, quadrature-multiplexed in the manner similar to data signals, and transmitted as radio waves in the radio frequency band 55 same as that of data signals.

FIG. 2 shows a quadrature multiplexing circuit only for a single channel for the simplicity of the drawing. In an actual CDMA transmission circuit, signals of a plurality of channels (data signal channels and pilot signal channels) spectrum-spread by specific spreading codes are multiplexed for each of the I and Q signal components, and supplied to the multipliers 502A and 502B for quadrature multiplexing.

At each mobile station 52, signals received by the antenna are supplied to multipliers 504A and 504B to quadrature-detect them by signals having a local oscillation frequency and generated by an oscillator 520. Output signals from this detection circuit are supplied to LPFs (Low Pass Filters) 56A and 56B to eliminate high frequency components and obtain reception signals (I', Q') 1.

Since an oscillator 510 for quadrature multiplexing at the base station and the quadrature detection (demodulation) oscillator 520 at each mobile station operate asynchronously, the detected reception signals (I', Q') 1 contain signal value errors caused by a phase shift (or frequency shift) from the phase (frequency) at the modulation side. The quadrature detection by the oscillator 520 is tentative so that the reception signals (I', P') 1 are required to be subjected to signal processing for eliminating phase errors (hereinafter called "phase correction").

FIG. 3 shows the structure of a conventional mobile station detection circuit for removing signal value errors caused by the phase shift, from the reception signals (I', P') 1, and for regenerating the data signals (I, Q) same as that transmitted from the base station.

A pilot signal despreading circuit 21 despreads the reception signals 1 by using spreading codes 26 for pilot symbol, and generates phase error signals ($\Delta\cos\phi$, $\Delta\sin\phi$) 22 changing with a phase shift angle. An averaging circuit 23 averages the phase error signals ($\Delta\cos\phi$, $\Delta\sin\phi$) 22 outputted from the despreading circuit 21, for a period of a plurality of chips, and generates correction signals ($\Delta COS\phi$, $\Delta SIN\phi$) 24 which are supplied to a phase correction circuit 30. A spreading code generation circuit 25 Generates spreading codes ($PN_{IP}$, $PN_{QP}$) for pilot symbol to be supplied to the pilot signal despreading circuit 21 and spreading codes ($PN_{ID}$, $PN_{QD}$) for data symbol to be supplied to a data signal despreading circuit 32 to be described later. The spreading codes ($PN_{ID}$, $PN_{QD}$) for data symbol have a code pattern specific to each signal channel.

A delay circuit 28 delays the reception signals 1 by a time duration corresponding to the time required for the averaging circuit 23 to perform an averaging process for the phase error signals (Δcosφ, Δsinφ). The phase correction circuit 30 corrects the phases of signals 29 outputted from the delay circuit 28. A data signal despreading circuit 32 despreads phase-corrected signals 31 by spreading codes 27 for data symbol. Accumulators 34 convert data signals 33 outputted from the despreading circuit 32 and having the chip rate into demodulated data (I, Q) having the symbol rate of the transmission signal.

Referring to FIG. 10B, a relation between a transmission signal from the base station and a reception signal 1 at a mobile station will be described, while paying attention to a pilot signal whose signals (I, Q) are always transmitted as values (1, 1).

A pilot signal P1 transmitted at the base station with a value (I=1, Q=1) at the first sector in the I-Q signal constellation changes to a signal having a value (I=i', Q=q') at the mobile station in the I'-Q' signal constellation, assuming that the phase shift angle is φ. If the phase shift angle φ is greater than π/2, the pilot signal P1 is received at the mobile station as a signal in a different sector (second to fourth sectors) in the I'-Q' signal constellation, and takes a value quite different from the transmission signal at the base station.

On the assumption that the pilot signal P1 has essentially a value of i=q in the first sector in the I'-Q' signal constellation as indicated by a point P2, the phase shift amount (angle φ) between the I'-Q' signal constellation and the I-Q signal constellation is detected from the values of I and Q components of the received pilot signal.

Referring back to FIG. 3, the pilot signal despreading circuit 21 despreads the received signals (I', Q') 1 by using the spreading codes 26 for pilot symbol. Of the reception signals 1, the signal components I' are inputted to multipliers 210A and 211A, whereas the signal components Q' are inputted to multipliers 210B and 211B. $PN_{IP}$ of the spreading code 26 for pilot symbol of the I components is supplied to the multipliers 210A and 210B, whereas $PN_{QP}$ of the spreading code 26 for pilot symbol of the P components is supplied to the multipliers 211A and 211B. Outputs of the multipliers 210A and 211B are added together by an adder 212A, whereas outputs of the multipliers 210B and 211AB are subtracted by a subtractor 212B.

Because of the above-described phase shift, both the reception signals I' and Q' contain both the I and Q components of the transmission pilot signals. At the pilot signal despreading circuit 21, the reception signal I' is despread by the spreading codes $PN_{IP}$ and $PN_{QP}$ to obtain the Ii and Iq components of the pilot signal, whereas the reception signal Q' is despread by the spreading codes $PN_{IP}$ and $PN_{QP}$ to obtain the Qi and Qq components of the pilot signal. Furthermore, the Ii and Qq components are added together by the adder 212A to obtain the phase error signal Δcosφ proportional to COSφ, whereas the Qi components are subtracted by the Iq components by the subtractor 212B to obtain the phase error signal Δsinφ proportional to SINφ.

The averaging circuit 23 averages the phase error signals (Δcosφ, Δsinφ) 22 outputted from the despreading circuit 21 for a period of a plurality of chips, and generates phase correction signals (ΔCOSφ, ΔSINφ) 24 with noises being eliminated.

The averaging circuit 23 is constituted by, for example as shown in FIG. 4, two analog value shift registers (serial to parallel converters) and two adders 235 and 236. The two shift registers are constituted by a plurality of one-chip delay gates (Dc) 230 connected in series for shifting the phase error signals Δcosφ and Δsinφ. The adders 235 and 236 add the output signals from the respective delay gates 230.

A delay gate Ds corresponding to one symbol is formed by serially connected one hundred and twenty eight one-chip delay gates (Dc) 230. In this example, each shift register is constituted by serially connected three symbol delay gates 231, 232, and 233, and the values of the phase error signals Δcosφ and Δsinφ corresponding to the 128×3 chips continuous on a time axis are added together by the adders 235 and 236 to thereby obtain the phase correction signals ΔCOSφ and ΔSINφ with noises being eliminated through averaging.

The delay circuit 28 is constituted by, for example as shown in FIG. 5, two analog value shift registers (delay circuit) each formed by a plurality of serially connected one-chip delay gates Dc 280. The number N of delay chips required for the averaging circuit 23 (in this example, N=128×3) and the number M of delay chips required for the delay circuit 28 satisfy the condition of M=(N−1)/2.

This condition is set because the phase errors of the received data signals are corrected by the phase correction values obtained by a set of pilot signals extending before and after the received data signals by a predetermined number of chips.

In this example, M=191.5. Therefore, the number M of delay chips is set to "191" or "192". Ds 281 is a delay gate unit corresponding to one symbol having one hundred and twenty eight one-chip delay gates Dc 280. In order to set the total number of delay chips to "191" or "192", the delay gate unit 281 is connected to a half symbol delay unit Ds' 282 which is constituted by sixty three or sixty four one-chip delay gates Dc 280.

In the phase correction circuit 30, for example as shown in FIG. 6, the I' and Q' components of delay data 29 outputted from the delay circuit 28 are multiplied respectively by the correction signals 24 of COSφ and SINφ by multipliers 301A, 301B, 302A, and 302B, and addition and subtraction are performed by an adder 303A and a subtractor 303B to correct the errors of the received data signal values caused by the phase shift. In this manner, the data despreading circuit 32 can demodulate received data signals (I, Q) 35.

As described above, in the detection circuit of a conventional CDMA mobile communication system, an averaging process of phase errors detected from pilot signals and a delay and phase correction process of received data signals are both performed at a chip rate of spreading codes. Therefore, the circuit portions for performing these processes are required to be operated synchronously with high speed clocks, so that the constituent components of the detection circuit become expensive and a power consumption becomes large.

SUMMARY OF THE INVENTION

It is an object of the present invention to provide a mobile station of a CDMA mobile communication system and a detection method used at the mobile station, capable of performing a phase correction process by using low speed clocks with lower power consumption requirements compared with conventional CDMA mobile communications systems.

In order to achieve the above object, at a mobile station of this invention, a phase error signal outputted from a pilot signal despreading circuit at a chip rate of a despreading code and a data signal outputted from a data signal despreading circuit at the chip rate of the despreading code are converted into signals having a symbol rate of transmission data, and the phase of the data signal is corrected by a correction signal generated by the phase error signal.

In this case, phase correction signals (COS$\phi$, SIN$\phi$) are obtained by serial-to-parallel converting phase error signals ($\Delta\cos\phi$, $\Delta\sin\phi$) converted to have a symbol rate by using relatively low speed shift registers operating at the symbol rate, and by averaging the phase error signals for a plurality of symbols by using adders.

In a conventional mobile station, after the phases of the reception signals are corrected, the reception signals are despread by using despreading codes for data symbol to extract the I and Q components of the reception data signals. According to the present invention, after the I and Q components of the reception signals obtained by quadrature detection are despread by the data signal despreading circuit, the transmission rate of the data signal group outputted from the data signal despreading circuit is changed to the symbol rate, and the data signal group is inputted via a delay circuit to a phase correction circuit.

With the above structure of this invention, the process of averaging phase error signals, data signal delay process, and data signal phase correction process can be performed at the symbol rate. Therefore, the circuit portions for these processes can be operated at low speed clocks and a power consumption can be reduced.

DESCRIPTION OF THE PREFERRED EMBODIMENTS

Figure 1:
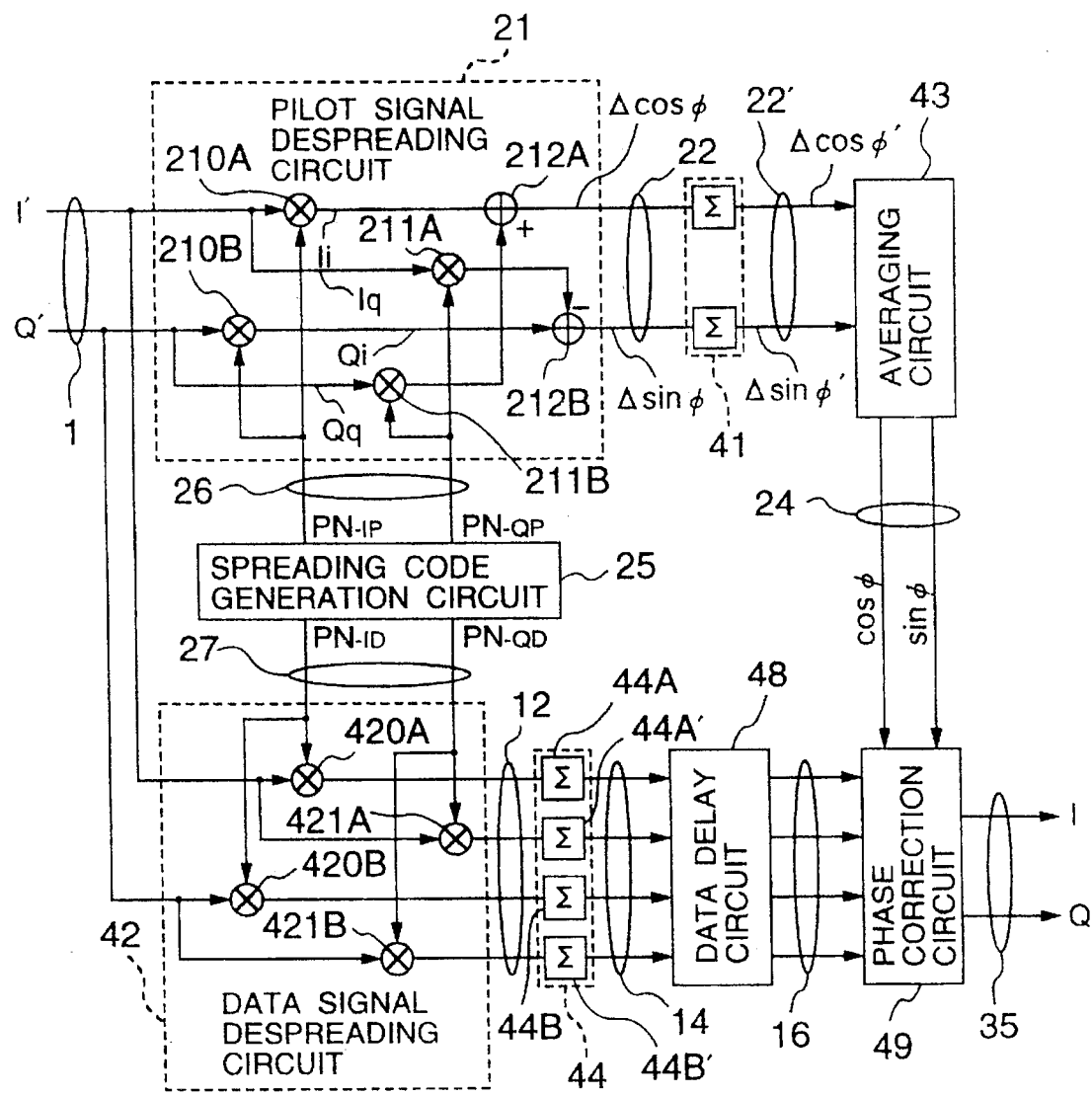
FIG. 1 is a block diagram of a detection circuit of a mobile station of a CDMA mobile communication system according to an embodiment of the invention.
Figure 2:
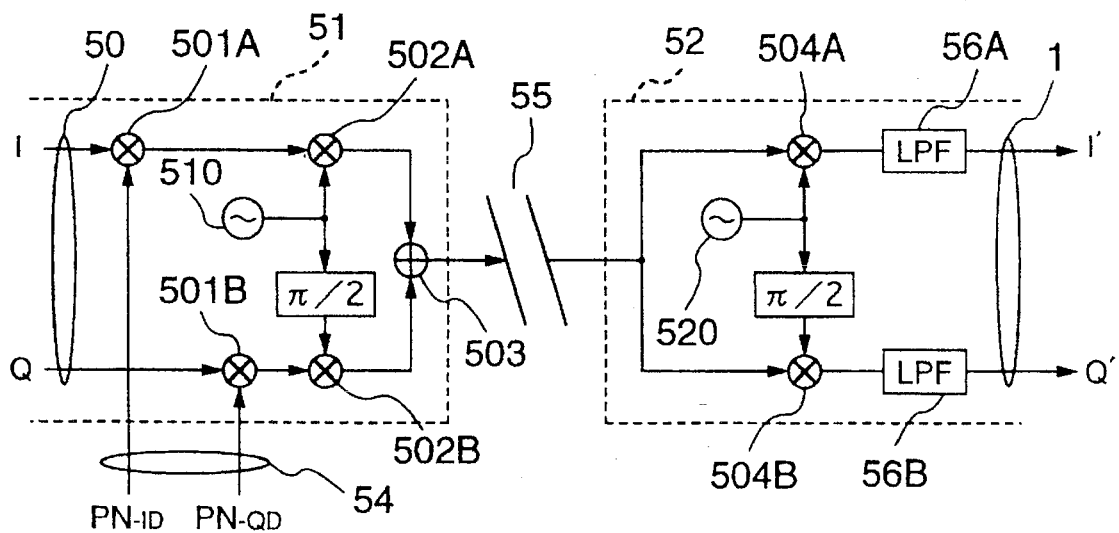
FIG. 2 is a diagram showing a quadrature multiplexing circuit of a base station and a quadrature detection circuit of a mobile station.
Figure 3:
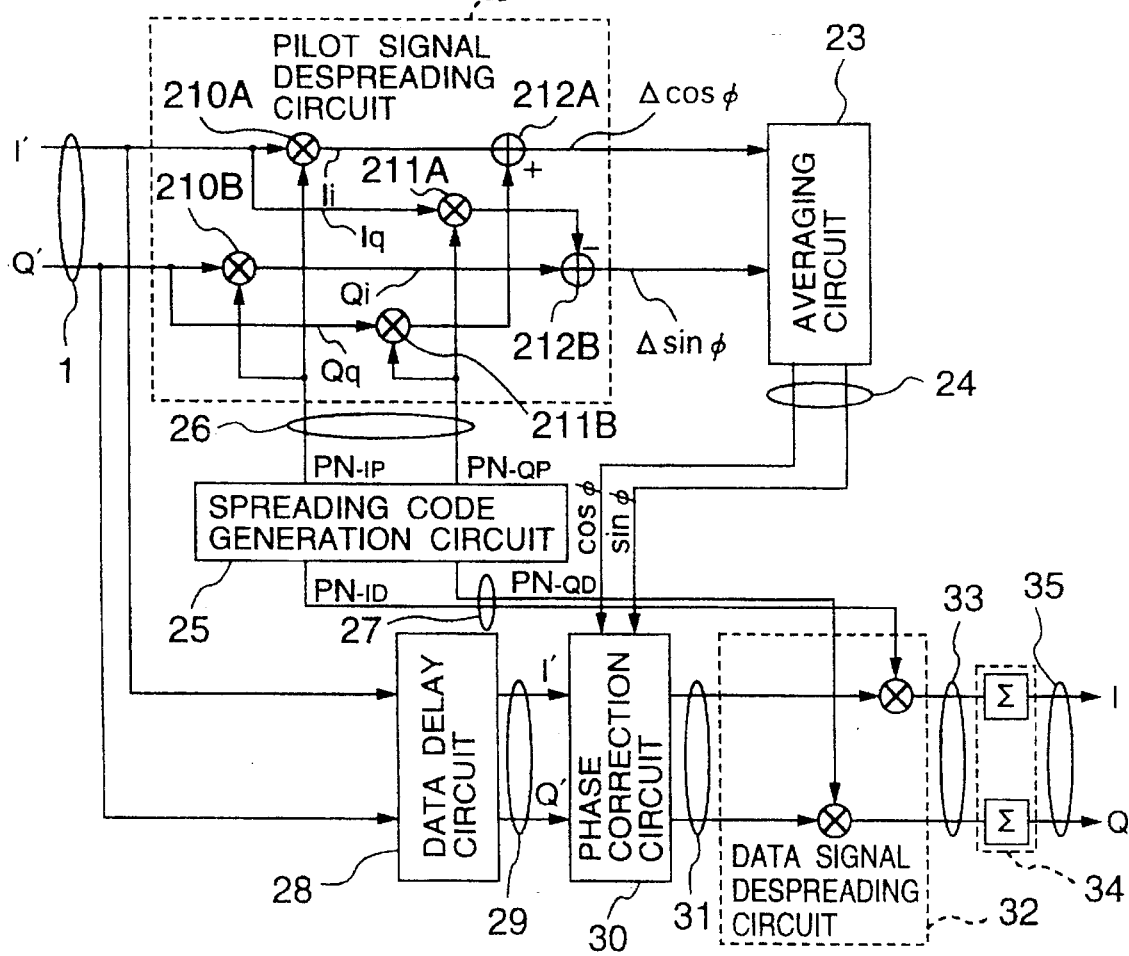
FIG. 3 is a block diagram showing an example of a conventional detection circuit of a mobile station of a CDMA mobile communication system.

FIG. 1 is a block diagram showing the structure of a detection circuit for a CDMA mobile communication system according to one embodiment of the present invention. In order to make it easy to compare the present invention with the conventional system shown in FIG. 3, circuit elements similar to those shown in FIG. 3 are represented by using the identical reference numerals used in FIG. 1.

In FIG. 1, a pilot signal despreading circuit 21 despreads the quadrature multiplexed reception signals 1 by using spreading codes for pilot symbol and generates phase error signals ($\Delta\cos\phi$, $\Delta\sin\phi$) 22 changing with a phase shift angle. Accumulators 41 convert the phase error signals outputted from the pilot signal despreading circuit 21 at a chip rate into signals ($\Delta\cos\phi'$, $\Delta\sin\phi'$) 22' of a symbol rate. An averaging circuit 43 averages the phase error signals ($\Delta\cos\phi'$, $\Delta\sin\phi'$) for a period of a plurality of chips, and generates phase correction signals. A spreading code generation circuit 25 generates spreading codes 26 ($PN_{IP}$, $PN_{QP}$) for pilot symbol and spreading codes 27 ($PN_{ID}$, $PN_{QD}$) for data symbol. A data signal despreading circuit 42 despreads the reception signals by using the spreading codes 27 for data symbol. Accumulators 44 convert the transmission rate of the data signals 12 despread by the data signal despreading circuit 42, from the chip rate into the symbol rate. A data delay circuit 48 delays the reception signals 14 of the symbol rate by a time duration corresponding to the time required for the averaging circuit 43 to perform an averaging process for the phase error signals. A phase correction circuit 49 corrects the phases of reception signals outputted from the data delay circuit 48. A data signal despreading circuit 32 despreads signals 31 with their phases corrected by phase correction signals 24. Reference numeral 35 represents phase corrected and demodulated data (I, Q).

The pilot signal despreading circuit 21 despreads the reception signals (I', Q') 1 by using the spreading codes 26 ($PN_{IP}$, $PN_{QP}$) for pilot symbol. In this case, both the reception signals I' and Q' are despread at multipliers 210A to 211B by using the I and Q components ($PN_{IP}$, $PN_{QP}$) of the despreading codes 27 for pilot symbol, and thereafter as shown in FIG. 1, addition and subtraction are performed by an adder 212A and a subtractor 212B to thereby obtain the values (phase errors) $\Delta\cos\phi$ and $\Delta\sin\phi$ proportional to the phase error angle $\phi$. The phase error signals 22 outputted from the pilot signal despreading circuit 21 at the chip rate are integrated by the accumulators 41 for each symbol period (128-chip period) to thereby convert them into the phase error signals ($\Delta\cos\phi'$ and $\Delta\sin\phi'$) 22' which are then supplied to the averaging circuit 43.

Figure 7:
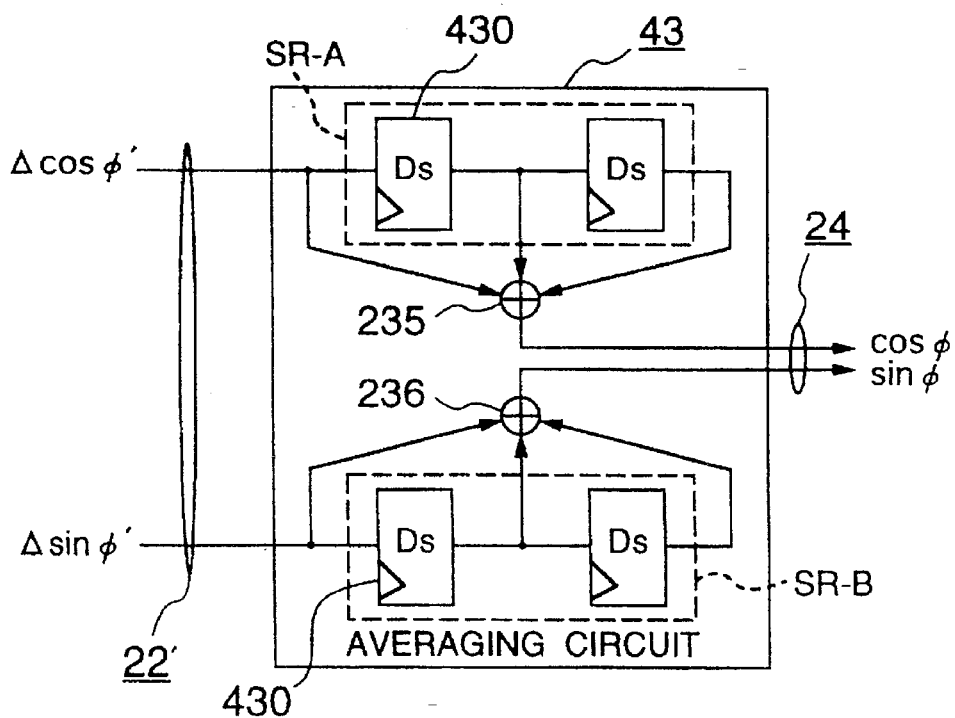
FIG. 7 shows the structure of an averaging circuit 43 for phase error signals according to the present invention.

The averaging circuit 43 averages the phase error signals ($\Delta\cos\phi'$, $\Delta\sin\phi'$) 22' inputted in a period of a plurality of symbols, and generates phase correction signals ($\Delta COS\phi$, $\Delta SIN\phi$) 24 for the reception data. An example of the structure of the averaging circuit 43 is shown in FIG. 7.

Figure 4:
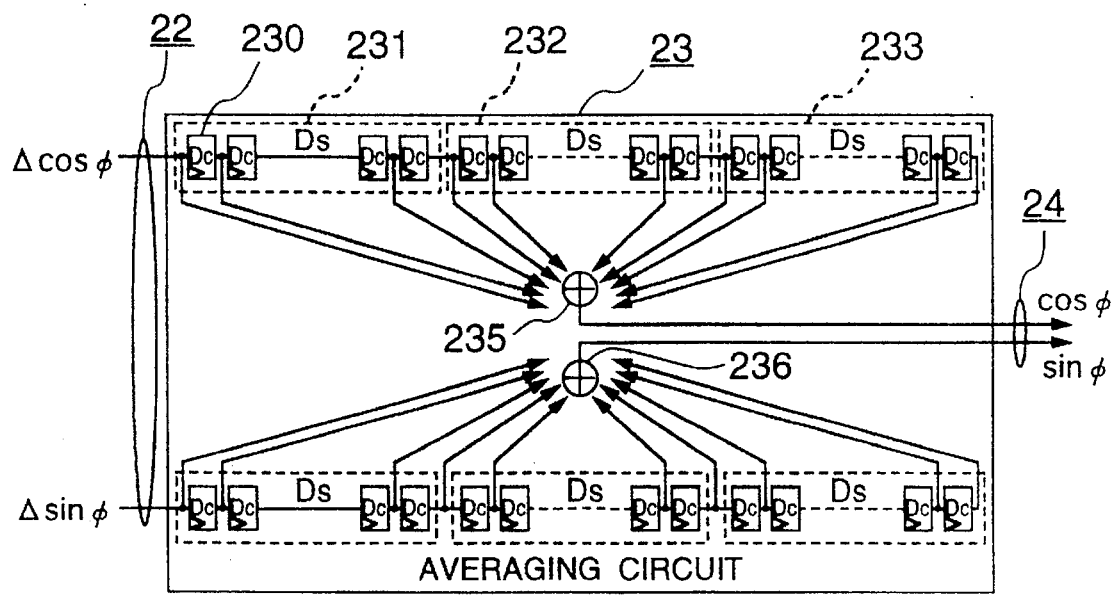
FIG. 4 shows the structure of a conventional averaging circuit 23 for phase error signals.
Figure 5:
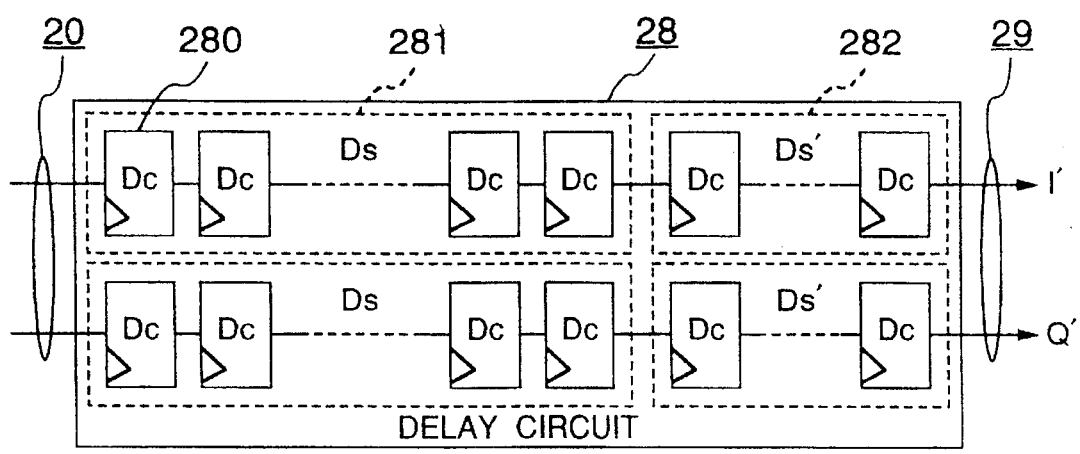
FIG. 5 shows the structure of a conventional delay circuit 28.
Figure 6:
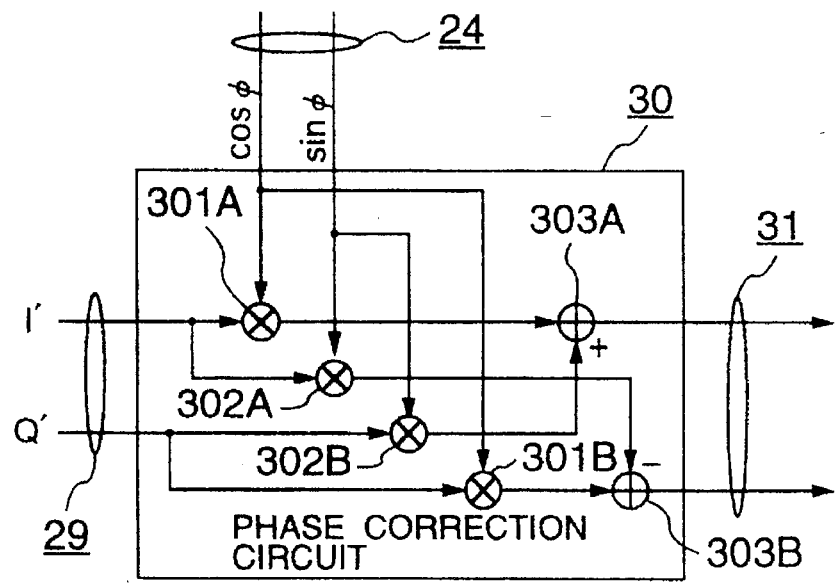
FIG. 6 shows the structure of a conventional phase correction circuit 30.

Ds 430 represents an analog gate having a one-symbol delay time. In this example, in order to eliminate noises from the phase error signals $\Delta\cos\phi'$ and $\Delta\sin\phi'$, the phase error signals $\Delta\cos\phi'$ and $\Delta\sin\phi'$ of the symbol rate are inputted to shift registers SR-A and SR-B each constituted by two-stage symbol delay gates 430. Two sets of the phase error signals of three symbols including an input signal to the shift register and output signals from the delay gates are added together by adders 431 and 432. The adders 431 and 432 multiply the addition results by proper coefficients to average the phase error signals $\Delta\cos\phi'$ and $\Delta\sin\phi'$ and to output the results as the phase correction signals $\Delta COS\phi'$ and $\Delta SIN\phi'$. The shift registers SR-A and SR-B are not necessary to be formed by a number of chip delay gates operating at a high speed chip rate as with the conventional technique illustrated in FIG. 4, but are formed by delay gates operating at a low speed symbol rate.

At the data signal despreading circuit 42, the reception signal I' is supplied to multipliers 420A and 421A, whereas the reception signal Q' is supplied to multipliers 420B and 421B. Four series of despread data signals 12 are obtained by supplying the spreading code $PN_{ID}$ to the multipliers 420A and 420B and by supplying the spreading code $PN_{QD}$ to the multipliers 421A and 421B. The transmission rate of these despread data signals 12 is converted from the chip rate into the symbol rate by four accumulators 44 (44A to 44B') provided in correspondence with the four multipliers 420A to 421B. Data signals 14 of the symbol rate are delayed by the data delay circuit 48 by a predetermined time determined by a time required for the averaging circuit 43 to perform an averaging operation.

Figure 8:
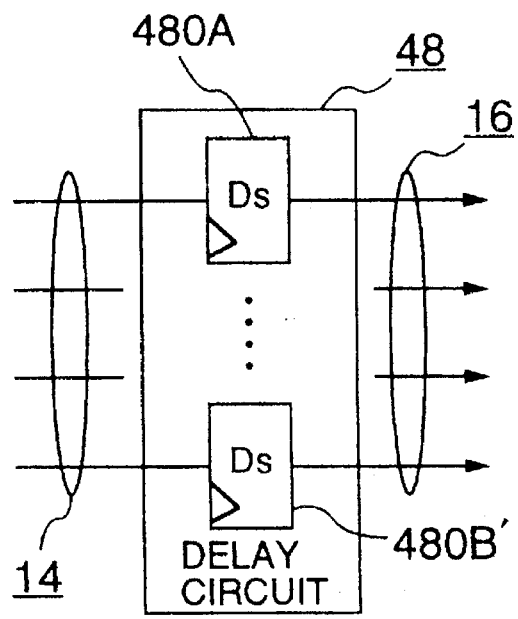
FIG. 8 is a diagram showing an example of the structure of a delay circuit 48 according to the present invention.

An example of the data delay circuit 48 is shown in FIG. 8. The number N of symbols required for averaging the phase error signals and the number M of delay chips required for the data delay circuit 48 satisfy the condition of $M=(N-1)/2$. As shown in FIG. 7, the averaging circuit 43 uses two-symbol shift registers (N=2) so that the number M of delay symbols necessary for the data delay circuit 48 is one. In this case, as shown in FIG. 8, the data delay circuit 48 delays the outputs of the accumulators by one-stage symbol delay gates Ds 480 (480A to 480B') each operating at the symbol rate.

The phase correction circuit 49 corrects the values of the data signals 16 outputted from the data delay circuit 48 at the symbol rate by using the phase correction signals 24 to thereby obtain the data signals I and Q with the influence of the phase errors being removed.

Figure 9:
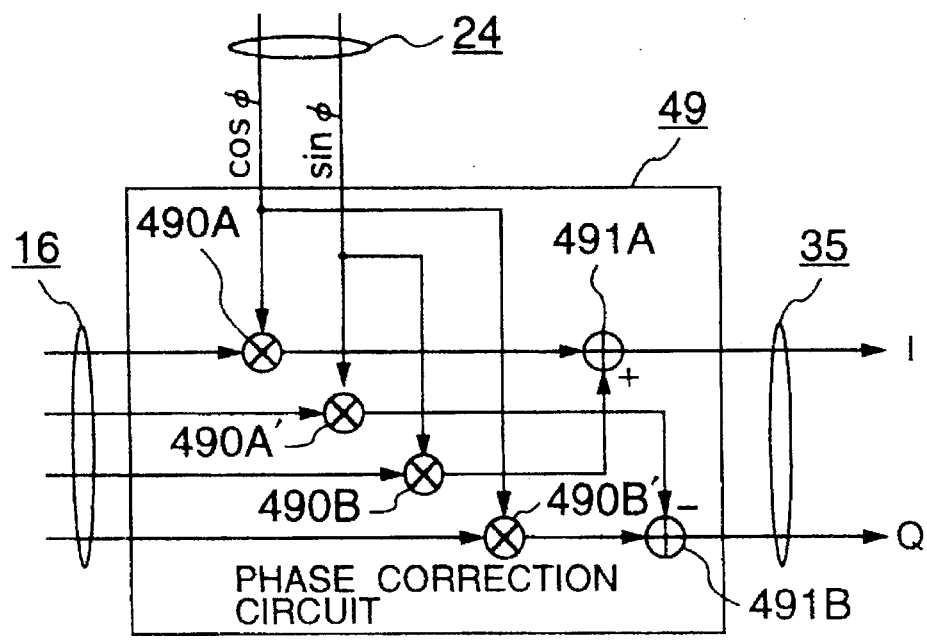
FIG. 9 is a diagram showing an example of the structure of a phase correction circuit according to the present invention.
Figure 10A:
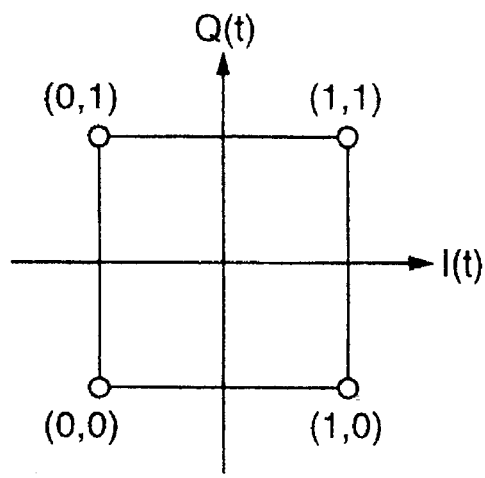
FIG. 10A is a diagram showing a signal constellation of QPSK.
Figure 10B:
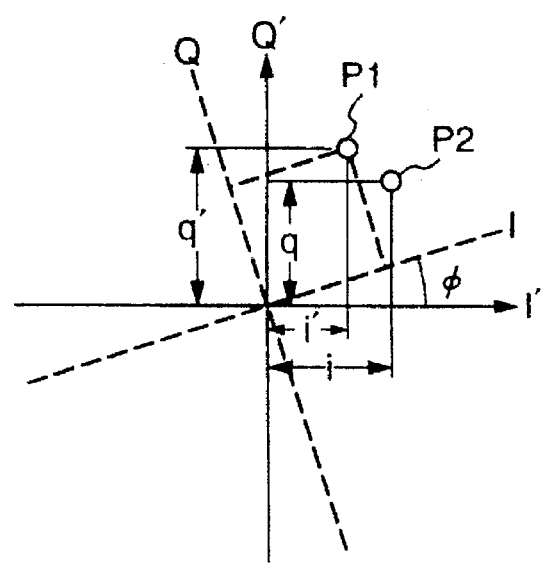
FIG. 10B is a diagram illustrating phase errors.

An example of the structure of the phase correction circuit 49 is shown in FIG. 9. Of the delayed data signals, the I component signal is multiplied by the phase correction signal COSϕ at multipliers 490A and 490A', whereas the Q component signal is multiplied by the phase correction signal SINϕ at multipliers 490B and 490B'. The multiplication results are subjected to addition and subtraction by an adder 190A and a subtractor 491B as shown in FIG. 9 to thereby obtain phase corrected data signals (I, Q) 35. By processing these data signals 35 by a decoding circuit (not shown), it is possible to demodulate data signals transmitted from the base station.

In the above embodiment, the pulse trains 12 and 22 obtained by despreading the reception signals by using the despreading codes for pilot symbol and data symbol, are converted into pulse trains of the symbol rate which are then subjected to phase correction. It is therefore possible to lower the clock rate of the circuit for correcting phase errors.

In the above embodiment, the phase error signals are averaged by three symbols. If the number of symbols to be averaged is five, seven, or nine, the number of delay gates of the data delay circuit is set to two, three, or four. In the circuit arrangement shown in FIG. 1, the functions of the averaging circuit 33, data delay circuit 48, and phase correction circuit 49 may be realized by software using a digital signal processor. In this case, a digital signal processor processes the input signals at the symbol rate so that the number of program executions for phase correction can be reduced considerably.

What is claimed is:

1. A mobile station in a code division multiple access mobile communication system, wherein a base station, multiplexes through spectrum-spread, a pilot signal and a data signal having I and Q components using specific spreading signals, quadrature multiplexes the I and Q components of the pilot signal and the data signal, and then transmits the quadrature multiplexed I and Q components of the pilot signal and the data signal as a reception signal to be received by said mobile station, said mobile station comprising:

a quadrature detection circuit for separating the reception signal into an I component multiplexed signal and a Q component multiplexed signal;

a first despreading circuit for generating first and second phase error signals having values corresponding to phase shifts between the quadrature detection circuit and a quadrature multiplexer of the base station, by despreading the I component multiplexed signal and the Q component multiplexed signal using spreading codes for a pilot symbol specific to I and Q components;

a circuit for generating first and second phase correction signals having a symbol rate of a data signal, by processing the first and second phase error signals supplied from said first despreading circuit;

a second despreading circuit for outputting a data signal group, by despreading the I and Q component multiplexed signals using spreading codes specific to I and Q components of respective data reception channels;

a first rate conversion circuit for converting the transmission rate of the data signal group output from said second despreading circuit into the symbol rate of the data signal; and a phase correction circuit for generating the I and Q component data signals not containing phase shifts, by correcting the value of each data signal of the data signal group of the converted symbol rate in accordance with the first and second phase correction signals.

2. A mobile station according to claim 1, wherein said circuit for generating the phase correction signals comprises:

a second rate conversion circuit for converting the transmission rate of the first and second phase error signals supplied from said first despreading circuit into the symbol rate of the data signal; and a pair of averaging circuits for generating the first and second phase correction signals by averaging the first and second phase error signals supplied from said rate conversion circuit, for a predetermined period, and said phase correction circuit comprises:

a delay circuit for delaying the data signal group having the converted symbol rate by a predetermined time determined by a signal delay time of said averaging circuits; and a calculation circuit for correcting the value of each data signal of the data signal group supplied from said delay circuit in accordance with the first and second phase correction signals, and generating the I and Q component data signals from the corrected data signal group.

3. A mobile station according to claim 2, wherein each of said pair of averaging circuits comprises:

a serial to parallel conversion circuit for time sequentially receiving the phase error signals from said second rate conversion circuit for a period of a plurality of symbols and outputting in parallel the received phase error signals; and means for receiving a plurality of phase error signals from said serial to parallel conversion circuit and generating the phase correction signal having a value averaged for the period of the plurality of symbols, and said delay circuit delays the data signal and supplies the delayed data signal to said calculation circuit, the delayed data signal corresponding to a central one of a plurality of phase error signals outputted in parallel from said serial to parallel conversion circuit.

4. A mobile station in a code division multiple access mobile communication system, wherein a base station multiplexes, through spectrum-spread, a pilot signal and a data signal having I and Q components using specific spreading signals, quadrature multiplexes the I and Q components of the pilot signal and the data signal, and then transmits the quadrature multiplexed I and Q components of the pilot signal and the data signal as a reception signal to be received by said mobile station, said mobile station comprising:

a quadrature detection circuit for separating the reception signal into an I component multiplexed signal and a Q component multiplexed signal;

a first despreading circuit for generating first and second phase error signals having values corresponding to phase shifts between the quadrature detection circuit and a quadrature multiplexer of the base station, by despreading the I component multiplexed signal and the Q component multiplexed signal using spreading codes for a pilot symbol specific to I and Q components;

a first rate conversion circuit for converting the transmission rate of the first and second phase error signals supplied from said first despreading circuit into a symbol rate of a data signal;

a second despreading circuit for outputting a data signal group, by despreading the I and Q component multiplexed signals using spreading codes specific to I and Q components of respective data reception channels;

a second rate conversion circuit for converting the transmission rate of the data signal group outputted from said second despreading circuit into the symbol rate of the data signal; and a signal processing unit for generating the I and Q component data signals not containing phase shifts, by correcting the value of each data signal of the data signal group supplied from said second rate conversion circuit in accordance with the first and second phase correction signals of the symbol rate supplied from said first rate conversion circuit.

5. A mobile station according to claim 4, wherein said signal processing unit comprises:

averaging means for generating first and second phase correction signals, by averaging the first and second phase error signals supplied from said first rate conversion circuit for a predetermined period; and delay means for delaying the data signal group supplied from said second rate conversion circuit by a predetermined time determined by a signal delay time of said averaging means, and each value of the data signal of the data signal group delayed by said delay means is corrected by the first and second phase correction signals.

6. A detection method for a mobile station in a code division multiple access mobile communication system, wherein a base station multiplexes through, spectrum-spread, a pilot signal and a data signal, and quadrature multiplexes the pilot signal and data signal for transmission as a reception signal from the base station to the mobile station, comprising the steps of:

separating through quadrature detection the reception signal into an I component multiplexed signal and a Q component multiplexed signal;

generating first and second phase error signals by despreading the I component multiplexed signal and the Q component multiplexed signal by using spreading codes for a pilot symbol specific to I and Q components;

generating a data signal group by despreading the I and Q component signals by using spreading codes specific to I and Q components of respective reception data channels;

generating first and second phase correction signals having a symbol rate of a data signal, by processing the first and second phase error signals;

converting the transmission rate of the data signal group into the symbol rate of the data signal; and generating the I and Q component data signals not containing phase shifts, by correcting the value of each data signal of the data signal group of the converted symbol rate in accordance with the first and second phase correction signals.

\* \* \* \* \*